United States Patent
Gupta (10) Patent No.: US 8,611,510 B2
(45) Date of Patent: Dec. 17, 2013

(54) SYSTEM AND METHOD FOR GUEST VOICEMAIL BOX

(75) Inventor: Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1521 days.

(21) Appl. No.: 12/004,802

(22) Filed: Dec. 20, 2007

(65) Prior Publication Data

US 2009/0161840 A1  Jun. 25, 2009

(51) Int. Cl.
*H04M 1/64* (2006.01)
*H04M 11/00* (2006.01)

(52) U.S. Cl.
USPC ............... 379/88.22; 379/88.18; 379/100.08; 379/202.01; 379/67.1; 379/88.01; 379/88.27; 379/88.12; 379/88.13; 379/88.14; 379/88.25

(58) Field of Classification Search
USPC ............ 379/88.18, 88.22, 100.08, 202, 67.1, 379/88.01, 88.27, 88.12, 88.13, 88.14, 379/88.25, 88.251
See application file for complete search history.

(56) References Cited

U.S. PATENT DOCUMENTS

| | | | |
|---|---|---|---|
| 4,555,592 A | | 11/1985 | Deinzer |
| 5,138,651 A | | 8/1992 | Sudo |
| 5,400,393 A | * | 3/1995 | Knuth et al. ............... 379/88.27 |
| 5,425,078 A | * | 6/1995 | Stern ......................... 379/88.23 |
| 5,995,596 A | * | 11/1999 | Shaffer et al. ............. 379/88.18 |
| 6,101,480 A | | 8/2000 | Conmy et al. |
| 6,115,455 A | * | 9/2000 | Picard ......................... 379/67.1 |
| 6,614,887 B1 | * | 9/2003 | Satapathy et al. .......... 379/88.22 |
| 6,859,417 B1 | | 2/2005 | Houg |
| 6,882,709 B1 | * | 4/2005 | Sherlock et al. ........... 379/90.01 |
| 6,914,977 B2 | * | 7/2005 | Danner et al. ........... 379/355.01 |
| 6,928,149 B1 | * | 8/2005 | Panjwani et al. .......... 379/88.25 |
| 6,996,212 B1 | * | 2/2006 | Baker et al. ................ 379/88.22 |
| 7,010,100 B1 | * | 3/2006 | Garg et al. ................. 379/88.12 |
| 7,505,571 B2 | * | 3/2009 | Bhatia et al. ............... 379/88.22 |
| 7,664,636 B1 | * | 2/2010 | Hirschberg et al. ........... 704/231 |
| 7,995,715 B2 | * | 8/2011 | Bhatia et al. ............... 379/88.12 |
| 8,036,345 B2 | * | 10/2011 | Jordan, Jr. .................. 379/88.12 |
| 8,358,751 B2 | * | 1/2013 | Parker et al. ............... 379/88.12 |
| 2002/0044642 A1 | * | 4/2002 | Danner et al. ........... 379/355.01 |
| 2003/0044654 A1 | | 3/2003 | Holt |
| 2003/0123624 A1 | * | 7/2003 | Colemon .................... 379/88.17 |
| 2004/0136505 A1 | * | 7/2004 | Garg et al. ................. 379/88.12 |
| 2004/0208303 A1 | | 10/2004 | Rajagopalan et al. |
| 2005/0152524 A1 | | 7/2005 | Carlson et al. |
| 2006/0046698 A1 | * | 3/2006 | O'Brien ......................... 455/413 |
| 2008/0112547 A1 | * | 5/2008 | Chin et al. ................ 379/100.08 |
| 2009/0106375 A1 | * | 4/2009 | Carmel et al. ................. 709/206 |
| 2010/0166161 A1 | * | 7/2010 | Dhawan et al. ............ 379/88.19 |
| 2010/0332518 A1 | * | 12/2010 | Song et al. ..................... 707/769 |
| 2010/0333116 A1 | * | 12/2010 | Prahlad et al. ................ 719/328 |

OTHER PUBLICATIONS

Non-Final Rejection date mailed Jul. 23, 2010 in U.S. Appl. No. 11/980,904.
Response filed Oct. 25, 2010 for U.S. Appl. No. 11/980,904.

* cited by examiner

*Primary Examiner* — Lisa Hashem
(74) *Attorney, Agent, or Firm* — Swanson & Bratschun, L.L.C.

(57) ABSTRACT

A system and method for establishing guest mailboxes. User input to partition a voicemail box of a user is received to create a guest voicemail box. The voicemail box is partitioned to create the guest voicemail box. An access number is established for the guest voicemail box. The guest voicemail box is removed based on an expiration.

20 Claims, 6 Drawing Sheets

SYSTEM AND METHOD FOR GUEST VOICEMAIL BOX

BACKGROUND

The use of and development of communications has grown nearly exponentially in recent years. The growth is fueled by larger networks with more reliable protocols and better communications hardware available to service providers and consumers. Users have similarly grown to expect better communications from home, work and on the go.

Despite the growth in the communications field, the methods for receiving voice messages are still quite limited to traditional methods, configurations, and setups. Voice messages are valuable because of the emphasis, emotion, voice identification, personality, and large amount of information that a user may easily and efficiently communicate in a message or recognize from a message. Individuals that work as substitutes, replacements, or temps may not have access to voicemail. For example, substitute teachers frequently do not have access to voicemail even though voicemail could be very valuable during the time they work at an educational facility. In order to use voicemail, a substitute may be required to use a personal device or be provided the password of a permanent employee despite the privacy and security concerns that may be associated with such an action.

SUMMARY

One embodiment includes a system and method for establishing guest mailboxes. User input to partition a voicemail box of a user may be received to create a guest voicemail box. The voicemail box may be partitioned to create the guest voicemail box. An access number may be established for the guest voicemail box. The guest voicemail box may be removed based on an expiration.

Another embodiment includes a system for generating voicemail boxes. The system may include a processor for executing a set of instructions and a memory for storing the set of instructions. The set of instructions may be configured to receive user input to partition a voicemail box of a user into a plurality of voicemail boxes, partition the voicemail box into the plurality of voicemail boxes, establish an access number for the plurality of voicemail boxes, and remove the plurality of voicemail boxes based on a criteria.

Yet another embodiment includes a voicemail system. The voicemail system may include a user interface for receiving user input from a user. The voicemail system may also include a voicemail box in communication with the user interface for managing voice messages. The voicemail system may also include partition control logic in communication with the user interface configured to partition the voicemail box to create one or more guest voicemail boxes in response to the user input. The partition control logic may receive an access number for the one or more guest voicemail boxes and an expiration time for each of the one or more guest voicemail boxes from the user input.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments provide a system and method for partitioning a voicemail box. In particular, a user's voicemail box may be configured into one or more guest or temporary mailboxes. The guest mailbox may be particularly useful for individuals functioning as substitutes or temporary workers or service providers. The illustrative embodiments provide an efficient way to generate guest mailboxes and then delete, terminate, or remove the guest mailboxes when they are no longer needed. As a result, individuals temporarily accessing a phone number or telephonic device may be able to benefit from the utilization of voicemail.

Figure 1:
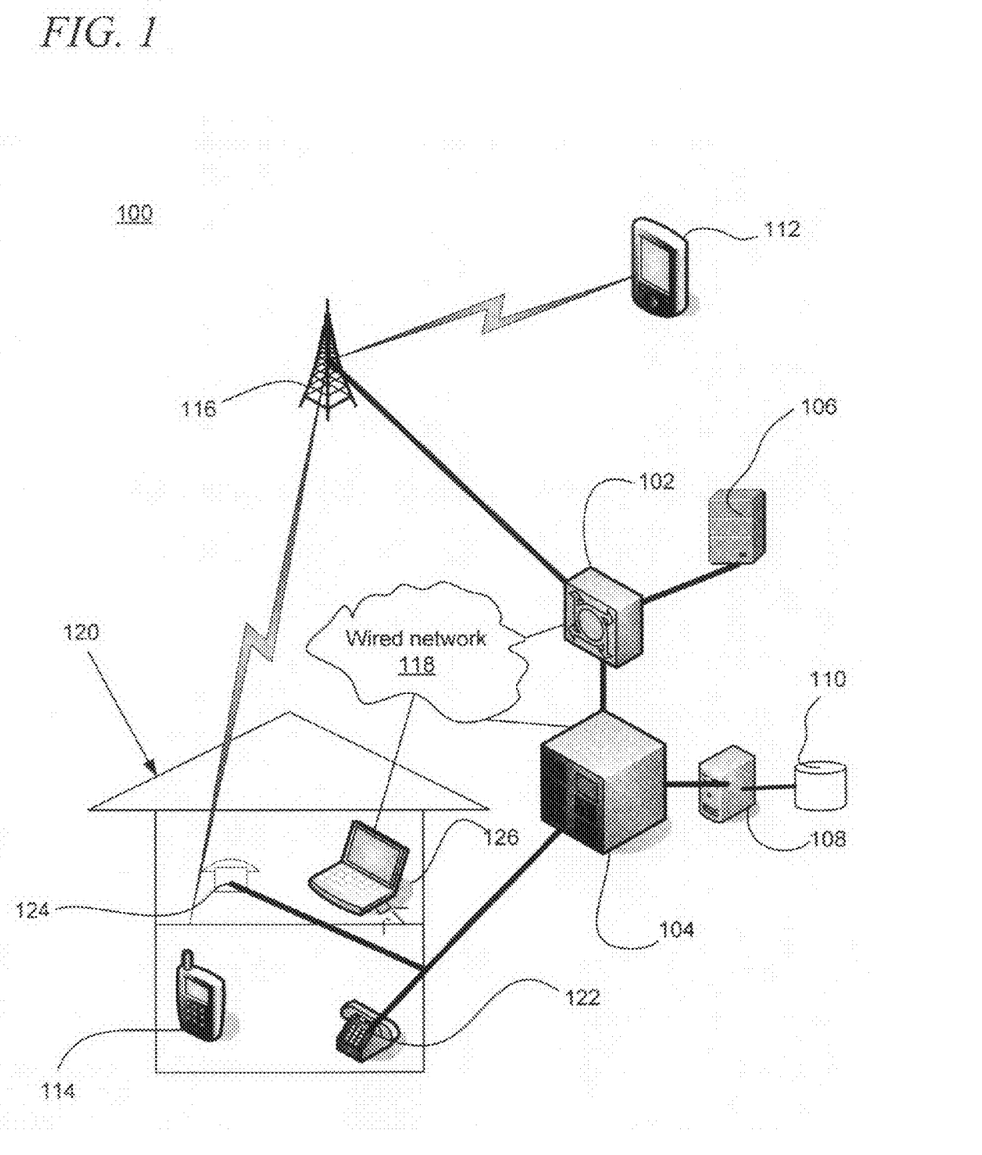
FIG. 1 is a pictorial representation of a communications system in accordance with an illustrative embodiment.

FIG. 1 is a pictorial representation of a communications system in accordance with an illustrative embodiment. The communication system 100 of FIG. 1 includes various elements used for wireless and wired communication. The communications system 100 includes a mobile switching center (MSC) 102, a local exchange 104, voicemail systems 106 and 108, a database 110, wireless devices 112 and 114, a transmission tower 116, a wired network 118, a home 120, home telephones 122 and 124, and a client 126. In one embodiment, the different elements and components of the communications system 100 communicate using wireless communications including satellite connections or hardwired connections, such as fiber optics, T1, cable, DSL, high speed trunks, and telephone lines.

The wireless devices 112 and 114 may communicate with the transmission tower 116 using communications protocols, such as time division multiple access (TDMA), code division multiple access (CDMA), global systems for mobile (GSM) communications, personal communications systems (PCS), WLAN, WiMAX, or other frequently used cellular and data communications protocols and standards. The wireless devices 112 and 114 may include cellular phones, Blackberry®, personal digital assistances (PDA), laptops, evolution data optimized (EDO) cards, multi-mode devices, and other wireless communication devices and elements.

Communications within the communications system 100 may occur on any number of networks which may include wireless networks, data or packet networks, private networks, publicly switched telephone networks (PSTN), and the wired network 118. The networks of the communications system 100 may represent a single communication service provider or multiple communications services providers. The features of the embodiments may be implemented by one or more elements of the communications system 100 independently or as a networked implementation.

In one embodiment, the MSC 102, voicemail system 106, and transmission tower 116 are part of a wireless network that is operated by a wireless service provider. For example, the control signals and operational features may be performed by the MSC 102 and the wireless signals may be broadcast from the transmission tower 116 to the wireless devices 112 and 114. The wireless network may include any number of systems, towers, servers, and other network and communications devices for implementing the features and performing the methods herein described.

The MSC 102 may be a switch used for wireless call control and processing. The MSC 102 may also serve as a point of access to the local exchange 104. The MSC 102 is a telephone exchange that provides circuit switched calling and mobility management and may also provide GSM or PCS services to the wireless devices 112 and 114 located within the area the MSC 102 serves. The MSC 102 may include a home locator record (HLR) and virtual locator record (VLR) that may be used to implement different features of the illustrative embodiments. The voicemail system 106 may be an integrated part of the MSC 102 or alternatively may be an externally connected device.

In one embodiment, the voicemail system 106 may include an integrated database for storing customer and usage information and data. In another embodiment, the voicemail system 106, a server, or other intelligent network device may store user preferences and implement the guest mailbox, as further described herein. The user may communicate, interact, or send and receive data, information, and commands to the voicemail system 106 through the telephones 122 and 124, wireless device 112 and 114, or the client 126. The MSC 102 and voicemail system 106 may include any number of hardware and software components. In one embodiment, the MSC 106 is an advanced intelligence network device with software modules equipped to perform guest mailbox features and functions.

The local exchange 104 and the MSC 102 communicate using a signal control protocol, such as a signaling system number 7 (SS7) protocol. The SS7 protocol is used in publicly switched networks for establishing connections between switches, performing out-of-band signaling in support of the call-establishment, billing, routing, and implementing information-exchange functions of the publicly switched network 134. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the voicemail system 106. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 may be located at a local telephone company's central office, or at a business location serving as a private branch exchange. The local exchange 104 may provide dial-tone, calling features, and additional digital and data services to subscribers, such as home phones 122 and 124. The local exchange 104 may also enable VoIP communication of the home telephones 116 and 118 through a data network VoIP works by sending voice information in digital form in packets, rather than in the traditional circuit-committed protocols of the publicly switched network. The local exchange 104 may be a feature server, a call control agent, or an IP gateway for implementing VoIP communications.

The communications system 100 may further include any number of hardware and software elements that may not be shown in the example of FIG. 1. For example, in order to facilitate VoIP communications, the communications system and the MSC 102 and local exchange 104 in particular, may include application servers, media servers, service brokers, call agents, edge routers, gateways (signaling, trunking, access, sub, etc.), IP network service providers, adapters, exchanges, switches, users, and networks. The voicemail system 108 is similar to the voicemail system 106 except that it is equipped to handle voicemail for landline customers rather than wireless customers. One embodiment, of the voicemail systems 106 and 108 are further described in FIG. 4. The local exchange 104 or other components of a wire line network such as a data, PSTN, VoIP, or other wired network may implement the call guest mailbox features and perform the methods herein described.

The MSC 102 and the local exchange 104 may include an authentication space. The authentication space may be a partition of the server or other storage designated by the communications service provider. The authentication space may validate that a user or device, such as client 126, is allowed to authorize the MSC 102, local exchange 104, or corresponding voicemail system 106 and 108 to set preferences, implement changes, review information, or perform other updates. For example, a user may be first required to provide a secure identifier, such as a user name, password, or other authentication code or hardware interface, to verify the user is authorized to make changes within the authentication space.

The authentication information may be used to create a secure connection between the client and the MSC 102 or the local exchange 104. The secure connection may be a virtual private network tunnel, an encrypted connection, firewall, or other form of secured communications link The MSC 102 and local exchange 104 may use any number of gateways, proxies, applications, or interfaces for allowing the client 126 to the MSC 102 and local exchange 104 through the wired network 118. Alternatively, the client 126 may use a wireless network or other network to access the MSC 102 and local exchange 104. The MSC 102 and local exchange 104 may use a host client application for communicating with numerous clients.

The home 120 is an example of a dwelling or residence of a person or group that may use any number of communications services. The home 120 is shown as a residence in the illustrated example, however, the home 120 may also be an office, business, or other structure wired or otherwise suitably equipped to provide telephone, data, and other communication services to one or more customers. In one embodiment, the home 120 is equipped with multiple communication devices, including home telephones 122 and 124 and client 126. The home telephones 122 and 124 may be standard devices that provide dialing and voice conversation capabilities. Home telephone 122 may be integrated in any number of other devices or may be used in different forms. For example, the home telephone 122 may be part of a refrigerator. In another embodiment, the home telephone 124 may be integrated with a personal computer, such as client 126. The communications services accessible from the home telephones 122 and 124 may include standard telephone service or VoIP telephone service. The home telephones 122 and 124 may be VoIP telephones or may be standard telephones that include a modem and/or VoIP adapters for enabling VoIP communications.

The client 126 may be a personal computer for performing and executing programs and instructions and accessing the wired network 118. However, the client 126 may be any computing devices suitable for communicating with the wired network 118. The wired network 118 may be a fiber optic, cable, or telephone network or other wired network suitable for communication over a hard wired connection with the client 126. In one embodiment, the home 120 may include a wireless router, adapter, switch, hub, or other suitable interface that allows the client 126 to communicate with the wired network 118. The MSC 102 and local exchange 104 may use a graphical user interface (GUI), such as website or program accessible from the client 126 in order to enter and receive input preferences for a guest mailbox or other configuration preferences.

In an illustrative embodiment, the user may provide user input, stipulate a number of guest mailboxes to be created, enter pin numbers, or otherwise make selections and communicate commands using devices, such as wireless devices 112 and 114, home telephones 122 and 124, and client 126. At any time, a user may select to enable, order, initiate, configure, reconfigure or otherwise establish guest mailbox and communications parameters as herein described.

The user may activate the guest mailbox feature in a number of ways. For example, the user may use a command that informs a function trigger of a device or the device itself, such as the MSC 102, local exchange 104, voicemail systems 105 and 106, wireless device 112 and 114, home telephones 122 and 124, or client 126, to partition a voicemail box. In one example, the user may submit a command to activate the guest mailbox list by dialing *2 on the home telephone 122 and then entering a pass code, account code, password, pin number, or other identifier. The command may also be a password, voice activated, time activated, preset by user selection or any other suitable option, setting, command, or user input. In one embodiment, the user may have established multiple guest mailboxes for different callers that may be accessed using separate codes or pin numbers.

Figure 2:
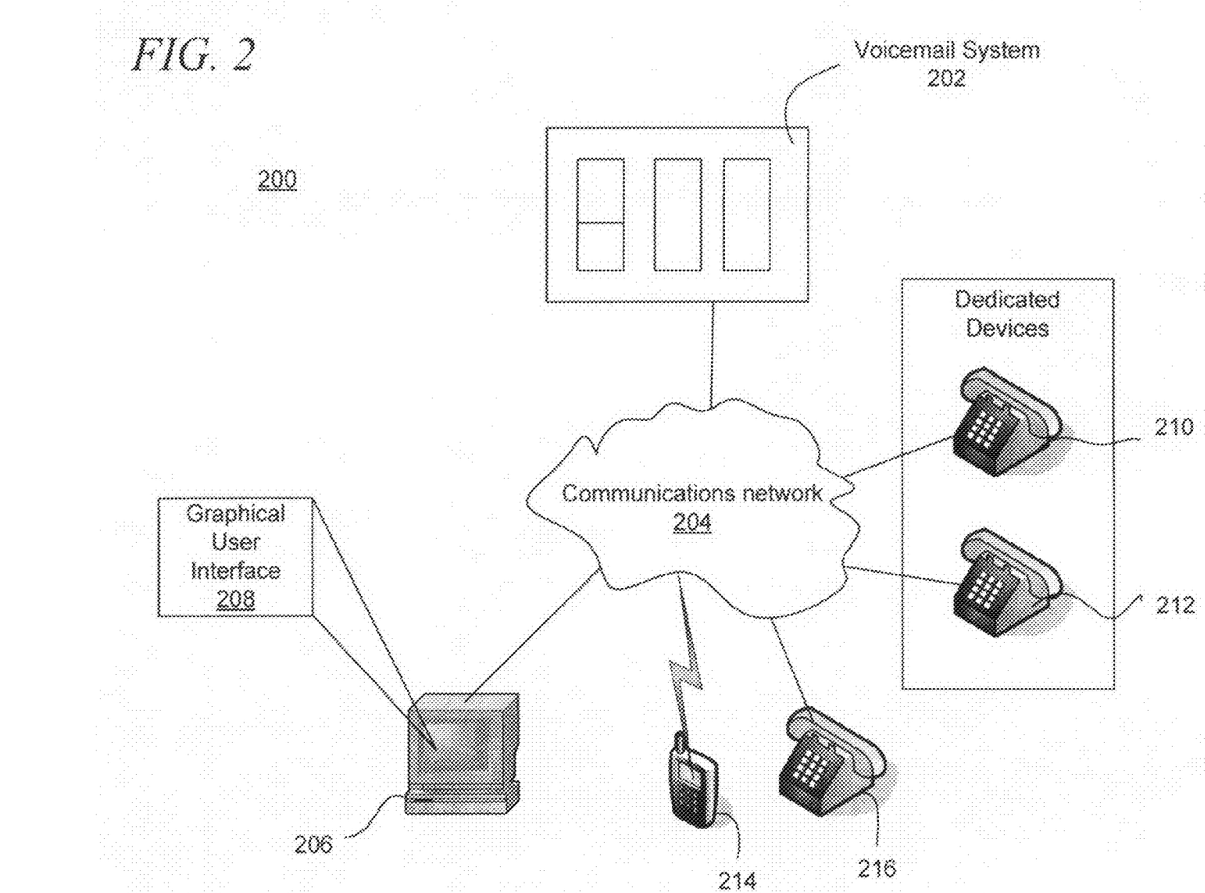
FIG. 2 is a pictorial representation of a communications management system in accordance with an illustrative embodiment.

FIG. 2 is a pictorial representation of a communications management system in accordance with an illustrative embodiment. The communication system 200 of FIG. 2 includes a voicemail system 202, a communications network 204, a remote client 206, a graphical user interface (GUI) 208, dedicated telephones 210 and 212, and telephones 214 and 216.

The voicemail system 202 may be a single component or may be multiple interconnected devices as shown in the embodiment of FIG. 2. The voicemail system 202 may include multiple servers, switches, intelligent network devices, computing devices, components and corresponding software for additionally performing the functions of a MSC, wireless access network switching network, and/or wireless public exchange. The voicemail system 202 may include an authentication space. The authentication space is a server or partition of a server designated for access by one or more users. The communications system 200 may communicate with any number of remote clients through the communications network 204.

The voicemail system 202 may perform configuration and changes for the communications network 204 and devices in communication with the communications network 204, such as dedicated telephones 210 and 212 and telephones 214 and 216. For example, a user may configure a guest mailbox, request services, features, files, or other elements from the voicemail system 202 through the communications network 204. As described, the user may configure a voicemail box associated or integrated with the dedicated telephones 210 and 212 or the telephones 214 and 216. The communications network 204 may use any number of broadcast transceivers, switches, hubs, routers, communications lines, and servers in addition to the voicemail system 202 to send and receive communications. As used herein, a person or device that communicates with a user or receiving party is generically referred to as a calling party or caller.

The dedicated telephones 210 and 212 and telephones 214 and 216, may be any type of telephonic device. For example, the telephones 210 and 212 and telephones 214 and 216 may be plain old telephone service (POTS) telephones, voice over Internet Protocol (VoIP) telephones, analog telephones, digital telephones, or wireless telephones. The dedicated telephones 210 and 212 may be considered dedicated because they are normally used by a single employee or at a single location. For example, the dedicated phones may be used by a teacher in one classroom. In another embodiment, the dedicated telephones 210 and 212 may represent a work station at which a temporary or substitute contract employee may be assigned. The dedicated telephones 210 and 212 and telephones 214 and 216 may each be partitioned to create any number of guest mailboxes. One or more of the guest mailboxes may be associated with phone numbers or the dedicated telephones 210 and 212 and telephones 214 and 216 themselves.

In one embodiment, the telephone is a wireless device which may include a cellular phone, a Blackberry®, personal digital assistant (PDA), laptop, evolution data optimized (EDO) card, multi-mode device, and other wireless communication elements. In one embodiment, the communications network 204 may include a wireless network. The wireless network may use any number of wireless communication formats including, but not limited to, code division multiple access (CDMA), global system for mobile (GSM) communications, time domain multiple access (TDMA), WiFi, and WiMAX The voicemail system 202 controls how and when the dedicated telephones 210 and 212 and telephones 214 and 216 communicate with other devices and other wireless networks, publicly switched networks, data networks, such as the Internet, and other public and private communications networks that interact with the communications network 204.

The voicemail system 202, the communications network 204, and the remote client 206 may communicate using a wired or wireless connection. For example, the remote client 206 may be connected to the voicemail system 202 by a fiber optic connection, T1, cable, DSL, satellite, high-speed trunk, or wireless connection. The voicemail system 202 and the remote client 206 may communicate using any number of communications protocols. In one embodiment, the communication is a common channel signaling system 7 (SS7). SS7 refers to the exchange of information between communications components required to provide and maintain service. The communications may also be based on transmission control protocol (TCP) and Internet protocol (IP) standards.

The voicemail system 202 may be an advanced intelligence network (AIN) device. AIN devices allow the voicemail system 202 and remote client 206 to quickly and economically create and modify telecommunication and voicemail services provided through the communications network 204 for the users. For example, the voicemail system 202 may update voicemail configurations for the dedicated telephones 210 and 212 and telephones 214 and 216 based on information received from the remote client 206. The voicemail system 202 may be operated by a wireless service provider or other communications service provider.

A user may access the graphical user interface 208 in order to manage a voicemail box, and guest mailboxes for the dedicated telephones 210 and 212 and telephones 214 and 216. Authentication information may be used to create a secured or unsecured connection between the remote client 206 and the voicemail system 202.

Once connected, the user may use the options, screens, and modules of the graphical user interface 208 to create guest mailboxes, edit user preferences, select pin numbers or passwords, and perform other tasks allowed within the authentication space. The authentication space of the server is configured so that the remote client 206 may only make changes to voicemail boxes and telephones controlled by the authentication space. In one embodiment, the graphical user interface 208 is a web page interface provided by the voicemail system 202. Each of the dedicated telephones 210 and 212 and telephones 214 and 216 may incorporate the features and services provided by the voicemail system. For example, the dedicated telephones 210 and 212 and telephones 214 and 216 may include a processor and memory storing instructions for partition, configuring, and removing guest mailboxes. The dedicated telephones 210 and 212 and telephones 214 and 216 may also be connected to the remote client 206 using an electronic interface to configure an internal voicemail system.

Figure 3:
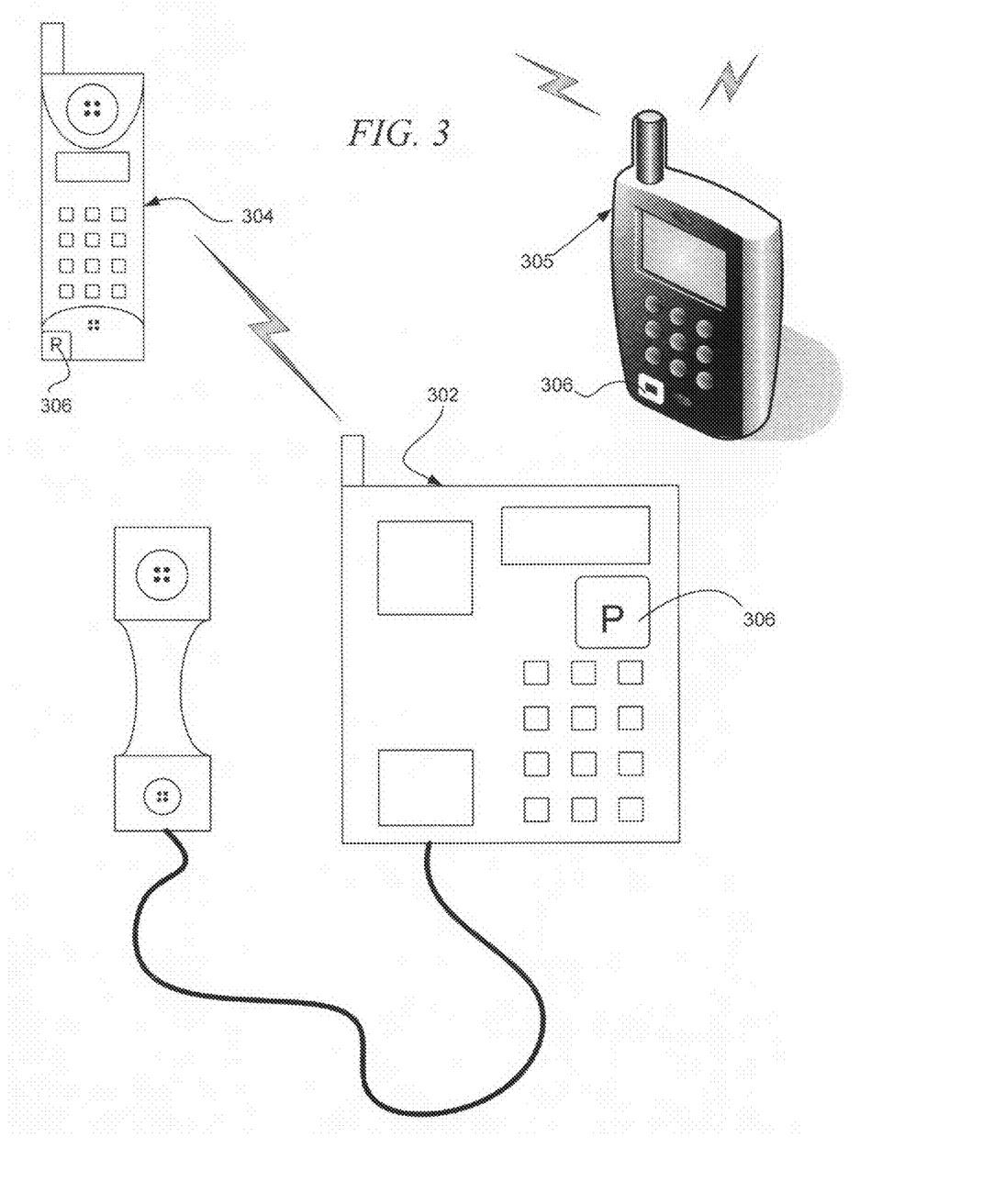
FIG. 3 shows examples of communications devices in accordance with illustrative embodiments.

FIG. 3 shows examples of communications devices in accordance with illustrative embodiments. FIG. 3 includes a standard telephone 302, a cordless telephone 304, and a wireless device 305. The standard telephone 302, the cordless telephone 304, and wireless device 305 may include a guest mailbox button 306. The standard telephone 302 and cordless telephone 304 are particular implementations of the standard telephone 122 of FIG. 1. The wireless device 305 is a particular implementation of the wireless device 114 of FIG. 1.

The guest mailbox button 306 may be an interface, switch, circuit, or software module that allows the user to send a signal to configure or access a guest mailbox. The guest mailbox button 306 may be a graphical user interface, touch screen, voice command, scroll wheel, or other input device that generates the command signal to implement the guest mailbox when pressed, selected, or otherwise activated. The guest mailbox button 306 may implement a feature within the standard telephone 302, cordless telephone 304, or the wireless device 305. Alternatively, the guest mailbox button 306 may send a signal to an externally-connected device, such as a voicemail system or server, class 5 switch, local exchange, MSC, or other networked device to activate the guest mailbox feature.

The standard telephone 302 and cordless telephone 304 are telephones that operate in conjunction with a publicly-switched network and class 5 switch. In another embodiment, the communication service accessible from the standard telephone 302 and the cordless telephone 304 may be part of a voice over Internet protocol (VoIP) telephone service. The standard telephone 302 and cordless telephone 304 are provided dial tone through a wired connection to a home, business or other location in which the standard telephone 302 and cordless telephone 304 are located. The wireless device 305 may work in connection with one or more wireless networks.

In one embodiment, the user may select the guest mailbox button 306 to create or access a guest mailbox. Immediately upon creation, the user may then be required to enter a pin number or password to secure the newly created guest mailbox generated as a partition of the voicemail of the standard telephone 302, cordless telephone 304, and/or the wireless device 305.

Figure 4:
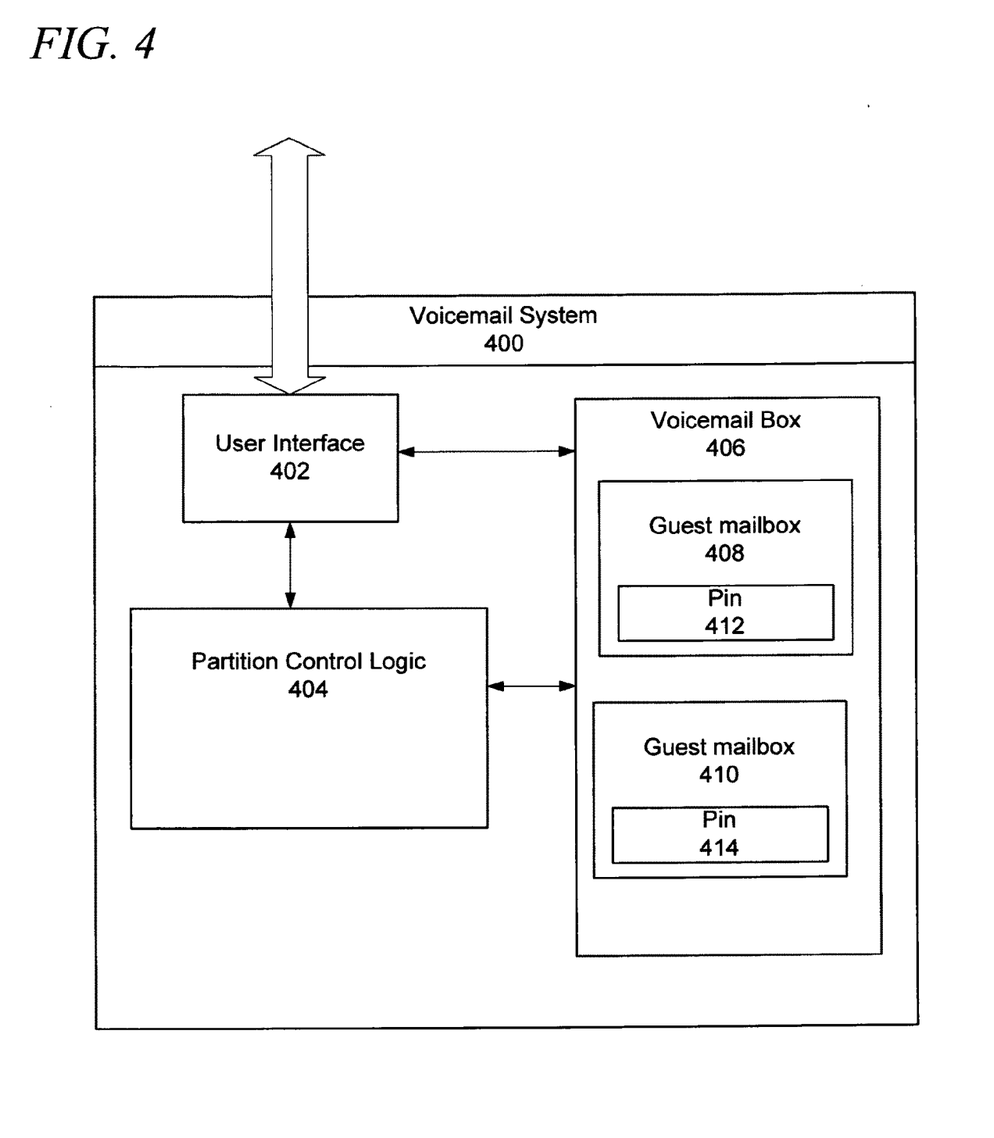
FIG. 4 is a block diagram of a voicemail system in accordance with an illustrative embodiment.

FIG. 4 is a block diagram of a voicemail system in accordance with an illustrative embodiment. The voicemail system 400 is one embodiment of a voicemail platform, server, or device. The voicemail system 400 is a particular implementation of the voicemail system 106 or 108 of FIG. 1. In another embodiment, the voicemail system 400 may be integrated with a POTS telephone, VoIP telephone, or wireless telephone. The voicemail system 400 may include a user interface 402, partition control logic 404, a voicemail box 406, guest mailboxes 408 and 410, and pins 412 and 414.

The different elements of the voicemail system 400 may be hardware or software elements. In one embodiment, each element corresponds to hardware components of the voicemail system 400 that implement the different services and features herein described. In another embodiment, the voicemail system 400 may be implemented using software modules, classes, or instructions that may be executed to perform the features, methods, and processes described herein.

The user interface 402 is an interface between the voicemail system 400 and one or more externally communicating users, devices, or connections. The user interface 402 may allow a user to interact with the voicemail system 400 and the voicemail box 406, and guest mailboxes 408 and 410. In particular, the user interface 402 may allow a user to configure the voicemail box 406. For example, the user may enter a selection to partition the voicemail box 406 into the guest mailboxes 408 and 410. The user interface 402 may receive commands, messages, or other user input through a wire line or wireless connection to a remote client, wireless device, landline telephone. The user interface 402 may be displayed on any number of user accessible devices in order to receive selections. The selections may be voice, data, text, tactile, teletype, or other input.

The partition control logic 404 is the logic controlling partitioning of the voicemail box 406. The logic may be hardware or software that enables a user or administrator to partition, split, or divide the voicemail box 406 to generate or create the voicemail box 406. In one embodiment, the partition control logic 404 may be integrated with the voicemail box 406. The partition control logic 404 may also save user preferences for implementing and utilizing the voicemail box 406 and corresponding guest mailboxes 408 and 410. For example, the user preferences may specify which mailbox is used as a default when a call is received and not answered. The partition control logic 404 may also control how and when the guest mailboxes 408 and 410 are deactivated, terminated, deleted, or become inactive. For example, the guest mailbox 408 may be automatically deleted after a week whereas the guest mailbox 410 may be deleted if it is not used within a thirty six hour period.

The voicemail box 406 is the device, element, or software construct configured to store voice messages from caller's and implement the standard features of a voicemail box. The voicemail system 400 may include any number of voicemail boxes. For example, the voicemail system 400 may store hundreds of voicemail boxes utilized by a corporation, firm, business, or organization.

The guest mailboxes 408 and 410 are temporary partitions with the voicemail box 406 generated by an owner of the voicemail box 406, system administrator, or other authorized system or personnel. However, the guest mailboxes 408 and 410 may be any other device, element, or software construct configured to allow a user to receive, review and manage a voicemail inbox. The voicemail box 406 may include a default setting for transferring incoming calls. For example, once the guest mailbox 408 is generated, all incoming calls that are not answered may be directed to the guest mailbox 408 rather than the voicemail box 406. The defaults and access to the guest mailboxes 408 and 410 may be controlled by the voicemail box 406 or the partition control logic 404.

The pins 412 and 414 are access codes, passwords, or other information suitable for permitting only specified individuals to access the guest mailboxes 408 and 410, respectively. The pins 412 and 414 may be assigned by the owner or administrator of the voicemail system 400 or the voicemail box 406 or may be selected by a user temporarily assigned to one of the guest mailboxes 408 and 410. In one embodiment, once the guest mailboxes 408 and 410 are created, the user may be required to assign the corresponding pins 412 and 414. For example, the user may assign the last four digits of the user's social security number as the pin 412 for a secretary working as a temp. In another embodiment, the voicemail box 406 may be associated with numerous pass codes or pins that may allow users to leave a message in the voicemail box 406 or the guest mailboxes 408 and 410 without having administrative access to listen to messages and configure the mailboxes.

The voicemail system 400 may employ a voice, text, or other interactive features as part of the user interface 402 for allowing a user to navigate the voicemail box 406 and guest mailboxes 408 and 410. In one embodiment, a user may configure a guest mailbox 408 assigned to her and then leave a message in the guest mailbox 410 and the voicemail box 406. As a result, a user may navigate within the voicemail system 400 according to the permissions and authorizations granted to the user.

The voicemail system 400 may include any number of computing elements that are not explicitly called out including a processor, memory, bus, transceivers, interfaces, and other hardware and software components. The processor may be a computer processor or other processing device or element used by the voicemail system 400 to execute instructions, modules, logic, or otherwise process data.

The memory may be a static or dynamic storage medium, such as static random access memory, flash memory, or dynamic random access memory. However, the memory may be a hard disk, read-only memory, or other suitable form or combination of volatile or nonvolatile memory. The memory may store user preferences, data, information, applications, and instructions for execution by the processor to implement the call transfer functions of the wireless management system.

Figure 5:
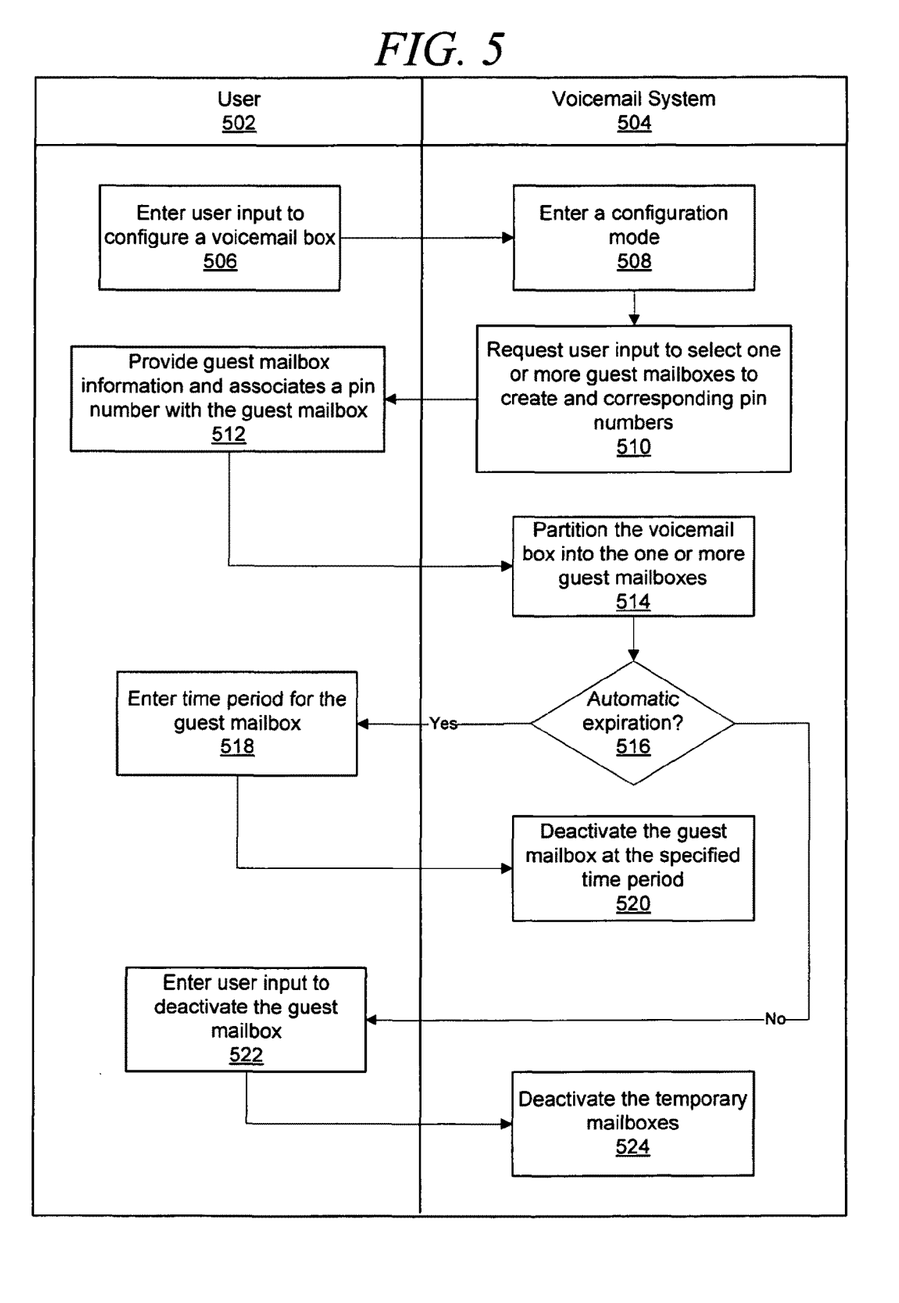
FIG. 5 is a flowchart of a process for generating a guest mailbox in accordance with an illustrative embodiment.

FIG. 5 is a flowchart of a process for generating a guest mailbox in accordance with an illustrative embodiment. The process of FIG. 5 may be implemented by a user 502 and a voicemail system 504. The process may begin with the user entering user input to configure a voicemail box (step 506). In one embodiment, the user may select a guest mailbox button or enter a command, such as *1234 to configure the voicemail box. For example, a school teacher may be gone for the day and an school administrator may select a guest mailbox button on the telephone to configure the voicemail box.

The voicemail system 504 enters a configuration mode (step 508). The voicemail system 504 requests user input to select one or more guest mailboxes to create and add corresponding pin numbers (step 510). The user 502 provides the guest mailbox information and associates a pin number with the guest mailbox (step 512). During step 512, the user may provide information regarding how many mailboxes are created and how each of the mailboxes is configured. The information may include preferences for maintaining or deleting the mailbox. In one embodiment, the guest mailbox may expire after twenty four hours of the last time it was accessed. In another embodiment, the user may specify an expiration time and date or a time period during which the guest mailbox is active. The guest mailbox information may include preferences for how the guest mailbox is implemented and utilized. For example, a phone number associated with the voicemail box may be automatically associated with the guest mailbox based on the information.

During step 512, the user 502 may also specify a pin number or password for the guest user to access the guest mailbox. The pin number may be specified by the owner of the voicemail box, an authorized administrator or user of the voicemail system 504, or may be indicated by the temporary user of the guest mailbox. In one embodiment, the guest mailbox may be assigned a pin number or password subsequently.

Next, the voicemail system 504 partitions the voicemail box into the one or more guest mailboxes (step 514). The original voicemail box used by a specified user is not deleted or removed; rather the voicemail box is partitioned, divided, or separated to generate the one or more guest mailboxes. The voicemail system 504 may be partitioned with preferences and settings specified by the user 502 in step 512. The voicemail system 504 determines whether the guest mailbox is set for automatic expiration (step 516). The determination of step 516 may be made based on the user input or information from steps 506 or 516.

If the guest mailbox is set to automatically expire, the user 502 enters a time period for the guest mailbox (step 518). The time period may be a specific date and time or a time period as previously discussed. For example, the user 502 may specify that the guest mailbox expires at 6:30 p.m., Jun. 21, 2010, or may alternatively specify twenty four hours from the time it was created. The voicemail system 504 deactivates the guest mailbox at the specified time period (step 520). During step 520, the voicemail box may return to default settings. The guest voicemail box may be deactivated, deleted, or otherwise terminated during step 520.

If the guest mailbox is not set to automatically expire in step 516, the user 502 enters user input to deactivate the guest mailbox (step 522). The user input may be a manual selection to deactivate or delete the guest mailbox. The user 502 may be required to provide a password or other authentication materials in order to deactivate the mailbox. The voicemail system 504 deactivates the guest mailbox (step 520). In another embodiment, the user may disengage the guest voicemail box and assign it to someone else as needed.

In one example, a social worker may have a number of clients. Because the clients may have limited resources or may work during the regular business hours of the social worker, the social worker may set up guest mailboxes for his or her clients. The clients may access their own guest voicemail box by entering a specified password, pin, or access code that is specifically assigned to them. As a result, even though the clients may not typically have access to the voicemail they may be able to telephonically access and navigate the guest voice mailboxes as well as leave messages and information for their social worker in the standard voicemail box. The client may use the voicemail box to receive any number of messages. In one embodiment, a prompt played by the voicemail system may indicate that the voicemail box has been partitioned, in another embodiment, the client may need to inform callers that they need to enter a special number or extension to access their guest mailbox to leave a message.

Figure 6:
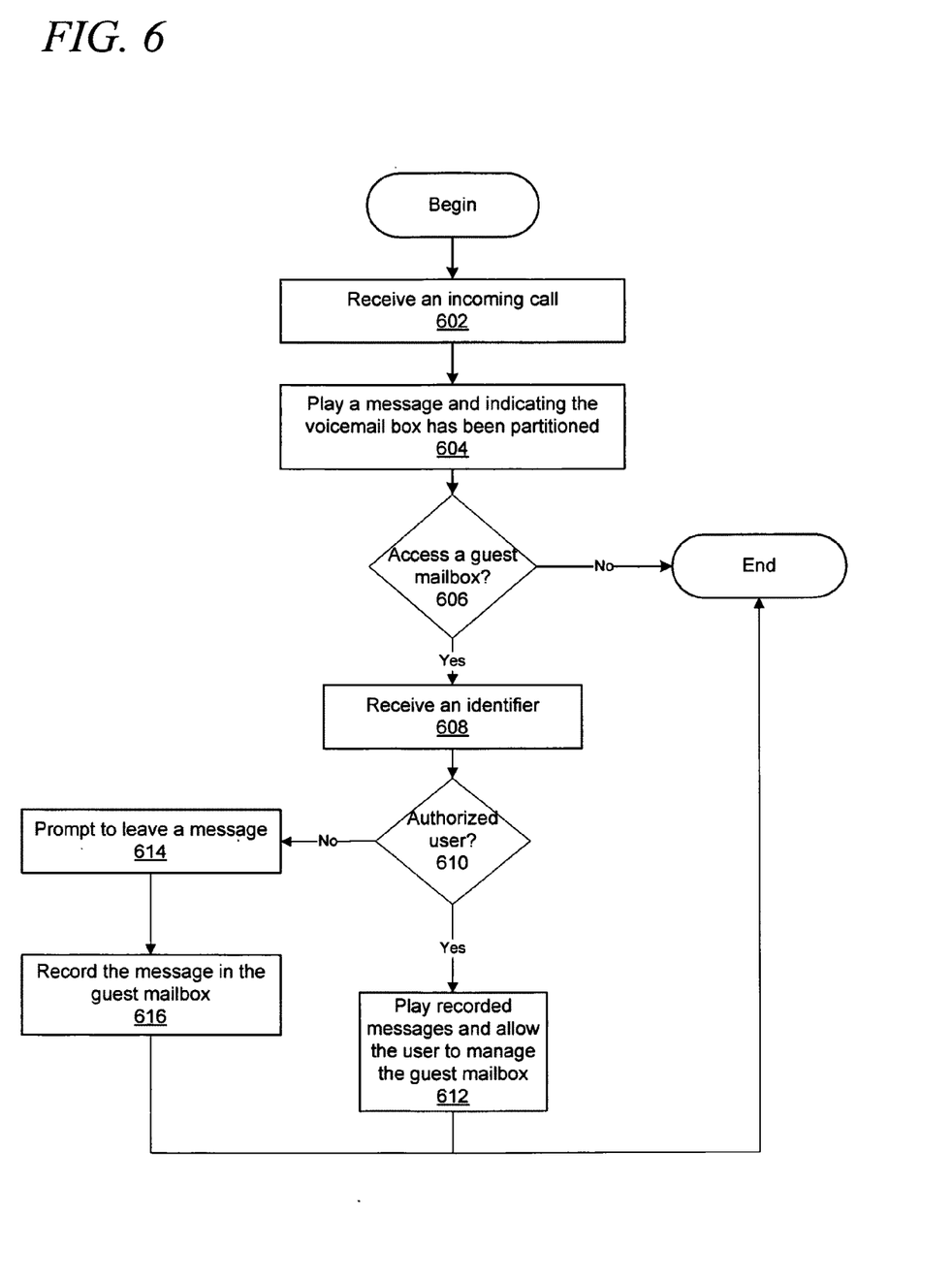
FIG. 6 is a flowchart of a process for accessing a guest mailbox in accordance with an illustrative embodiment.

FIG. 6 is a flowchart of a process for accessing a guest mailbox in accordance with an illustrative embodiment. The process of FIG. 6 may be implemented by a voicemail system. In one embodiment, the voicemail system may be integrated in a voicemail platform, server, or application or as part of a telephonic device.

The process may begin with the voicemail system receiving an incoming call (step 602). In one embodiment, the incoming call may be a traditional voice call. In another embodiment, the incoming call may be a user accessing the voicemail system by dialing a dedicated number or selecting a voicemail indicator.

The voicemail system plays a message indicating the voicemail box has been partitioned (step 604). The message of step 604 may indicate that a guest mailbox has been activated for the specified phone number or telephonic device.

For example, the message may say "The person you have reached is unavailable, a temporary voicemail box has been established for this phone number". In one embodiment, the message may simply state a text-to-voice or recorded name of the owner of the guest mailbox without mentioning the standard user of the voicemail box is unavailable.

Next, the voicemail system determines whether a user wants to access a guest mailbox (step 606). The determination of step 606 may be made based on user input, caller identification information, or other identifiers. In one embodiment, the user may be required to provide a selection by dialing *2 to access the guest mailbox. If the user does not want, need, or attempt to access the guest mailbox, the process terminates.

In another embodiment, a caller or owner of the guest mailbox may be required to enter the identifier, pin, or extension for the guest mailbox. The caller may be required to enter the identifier to be able to leave a message in the guest mailbox. If the caller forgets or is unable to specify the identifier or mailbox number, the caller may use the voicemail system to look up the mailbox number by entering the last name of the guest mailbox owner or other information that may identify the information necessary to access the guest mailbox. The owner of the guest mailbox may need to access the guest mailbox to retrieve messages or otherwise configure the guest mailbox based on current needs or preferences.

If the voicemail system determines the user may access a guest mailbox in step 606, the voicemail system receives an identifier (step 608). The identifier may be a pin number, password, pass code, keyword, or other identification element. The identifier may indicated whether the user is an owner or administrator of the guest mailbox or a person authorized to leave a message in the guest mailbox. In one embodiment, a user may not be required to have an identifier to leave a message. For example, a substitute teacher may be assigned a guest mailbox with the last four digits of his social security number utilized as the identifier that grants access to the guest mailbox.

Next, the voicemail system determines whether the user is an authorized user (step 610). The determination of step 610 may be made based on the identifier received in step 608. If the voicemail system determines the person is an authorized user, the voicemail system plays recorded messages and allows the user to manage the guest mailbox (step 612).

If the voicemail system determines the user is not an authorized user in step 610, the voicemail system prompts the caller to leave a message (step 614). The voicemail system then records the message in the guest mailbox (step 616). The identifier may provide a way of managing both who access the guest mailbox for configuration and message retrieval purposes as well as those who access the guest mailbox to leave messages. In one embodiment, a student may attempt to call her teacher only to find that a substitute has been assigned a guest mailbox, instead of not leaving a message indicating the student will be absent, the student may enter a student number as the identifier in order to leave a message that may be retrieved by the owner of the guest mailbox.

In one example, students in a classroom may have a designated identifier. The student's teacher may also have an identifier. In order to leave a message in the voicemail box or the guest voicemail box, the student may be required to enter the identifier. For example, the student may call in sick or request a homework assignment. In order to access the messages and configure the guest mailbox a substitute teacher may be required to provide a separate identifier. As a result, even if the normal teacher is gone, the substitute teacher may receive important voicemail communications from students, other educational staff or administrators, family, or others that may need to contact the substitute teacher. In one embodiment, any incoming messages may be sent to both the standard voicemail box and the guest mailbox. The routing or copying of messages may be set by the preferences or based on the identifier specified by the caller.

The illustrative embodiments allow a user to configure a single voicemail box for multiple users based on the current needs or events. Temporary users that may not have the means or resources to utilize a voicemail system may be assigned a guest mailbox by a user. On a shorter time frame, temporary, substitute, transitional, visiting, or displaced employees or personnel may be assigned a guest voicemail box. The guest mailboxes may be easily created and terminated from the voicemail system, individual telephones, or voicemail boxes without significant technical support or programming.

The previous detailed description is of a small number of embodiments for implementing the invention and is not intended to be limiting in scope. The following claims set forth a number of the embodiments of the invention disclosed with greater particularity.

What is claimed:

1. A method for establishing a guest voicemail box, the method comprising:
   receiving, with a computer, user input to partition a voicemail box of a user to create a plurality of temporary guest voicemail boxes;
   partitioning, with the computer, the voicemail box to create the plurality of temporary guest voicemail boxes;
   establishing, with the computer, an access number for the plurality of temporary guest voicemail boxes; and
   automatically removing, with the computer the plurality of temporary guest voicemail boxes based on a criteria received in the user input.

2. The method according to claim 1, wherein the receiving, partitioning, establishing, and automatically removing is performed by a voicemail system.

3. The method according to claim 1, further comprising:
   requiring selection of the access number in response to the partitioning; and
   associating the access number with at least one of the plurality of temporary guest voicemail boxes.

4. The method according to claim 1, wherein the criteria specifies an expiration time, wherein at least one of the plurality of temporary guest voicemail boxes is terminated based on the expiration time.

5. The method according to claim 1, further comprising:
   receiving user input to remove at least one of the plurality of temporary guest voicemail boxes.

6. The method according to claim 1, further comprising:
   entering a password to enable configuration of the voicemail box; and
   recording a prompt for at least one of the plurality of temporary guest voicemail boxes.

7. The method according to claim 1, further comprising:
   receiving an incoming communication from a caller;
   playing a prompt indicating the voicemail box has been partitioned and includes at least one of the plurality of temporary guest voicemail boxes; and
   recording a message from the caller.

8. The method according to claim 1, further comprising:
   determining whether a caller is authorized to access at least one of the plurality of temporary guest voicemail boxes; and
   granting access to at least one of the plurality of temporary guest voicemail boxes based on receiving the access number for playing one or more recorded messages and for configuring at least one of the plurality of temporary guest voicemail boxes.

9. The method according to claim 1, further comprising: determining whether a caller is authorized to leave a message based on the access number.

10. The method according to claim 1, further comprising: communicating between the voicemail box and at least one of the plurality of temporary guest voicemail boxes.

11. The method according to claim 1, wherein at least one of the plurality of temporary guest voicemail boxes is accessible from a device associated with the voicemail box.

12. The method according to claim 1, further comprising: associating a phone number linked with the voicemail box with at least one of the plurality of temporary guest voicemail boxes in response to the voicemail box being partitioned.

13. A system for generating temporary mailboxes, the system comprising:
a processor for executing a set of instructions; and
a non-transitory memory for storing the set of instructions, wherein the set of instructions are configured to receive user input to partition a voicemail box of a user into a plurality of temporary voicemail boxes, partition the voicemail box into the plurality of temporary voicemail boxes, establish an access number for the plurality of temporary voicemail boxes, and automatically remove the plurality of temporary voicemail boxes based on a criteria received in the user input.

14. The system according to claim 13, wherein the set of instructions partitions the voicemail box to generate the plurality of temporary voicemail boxes, wherein each of the plurality of temporary voicemail boxes is removed from the voicemail box based on a time expiration specified by the criteria.

15. The system according to claim 13, wherein a pass code is required to access the voicemail box and the plurality of temporary voicemail boxes, wherein the pass code specifies whether a caller may leave a message or whether the caller may configure one of the plurality of temporary voicemail boxes and play messages.

16. The system according to claim 13, wherein the set of instructions associates a phone number linked with the voicemail box with one of the plurality of temporary voicemail boxes in response to the voicemail box being partitioned.

17. A voicemail system comprising:
a user interface for receiving user input from a user;
a voicemail box in communication with the user interface for managing voice messages;
a non-transitory memory having stored thereon partition control logic in communication with the user interface configured to partition the voicemail box to create one or more guest voicemail boxes in response to the user input, wherein the partition control logic receives an access number for the one or more guest voicemail boxes and an expiration time for each of the one or more guest voicemail boxes from the user input.

18. The voicemail system according to claim 17, wherein the partition control logic associates a phone number linked with the voicemail box with one of the one or more guest voicemail boxes in response to the voicemail box being partitioned.

19. The voicemail system according to claim 17, wherein the user input includes a pass code required to access the voicemail box or the one or more guest voicemail boxes, wherein the pass code specifies whether the user may leave a message or whether the user may configure one of the plurality of voicemail boxes and play messages.

20. The voicemail system according to claim 17, wherein the partition control logic deletes the one or more guest mailboxes based on the expiration time.

* * * * *